(12) United States Patent
Brazier et al.

(10) Patent No.: US 10,139,005 B2
(45) Date of Patent: Nov. 27, 2018

(54) PRESSURE RELIEF DEVICE INTEGRITY SENSOR

(75) Inventors: Geof Brazier, Woodbury, MN (US); John Tomasko, Limerick (IE); Liam Fitzgerald, Limerick (IE); Stephen Farwell, Owasso, OK (US); Hughie Leahy, Castletroy (IE)

(73) Assignee: BS&B Safety Systems Limited, Limerick (IE)

( * ) Notice: Subject to any disclaimer, the term of this patent is extended or adjusted under 35 U.S.C. 154(b) by 145 days.

(21) Appl. No.: 13/388,022

(22) PCT Filed: Jul. 30, 2010

(86) PCT No.: PCT/US2010/043958
§ 371 (c)(1),
(2), (4) Date: Sep. 7, 2012

(87) PCT Pub. No.: WO2011/014798
PCT Pub. Date: Feb. 3, 2011

(65) Prior Publication Data
US 2012/0319857 A1    Dec. 20, 2012

Related U.S. Application Data

(60) Provisional application No. 61/213,937, filed on Jul. 31, 2009.

(51) Int. Cl.
*F16K 17/16*    (2006.01)
*F16K 37/00*    (2006.01)

(52) U.S. Cl.
CPC ............. *F16K 17/16* (2013.01); *F16K 37/00* (2013.01); *F16K 37/0083* (2013.01); *Y10T 137/1789* (2015.04); *Y10T 137/8158* (2015.04)

(58) Field of Classification Search
CPC ...... F16K 37/00; F16K 17/06; F16K 37/0083; F16K 37/0091; Y10T 137/1789;
(Continued)

(56) References Cited

U.S. PATENT DOCUMENTS 4,263,929 A    4/1981  Kearney
4,372,334 A *  2/1983  Paul, Jr. ........................ 137/12
(Continued)

FOREIGN PATENT DOCUMENTS

EP    0 033 867    8/1981
EP    0 064 807    11/1982
FR    2.133.028    11/1972

OTHER PUBLICATIONS

International Search Report from the European Patent Office for International Application No. PCT/US2010/043958, dated Jan. 18, 2011.
(Continued)

*Primary Examiner* — Mirza Alam
(74) *Attorney, Agent, or Firm* — Finnegan, Henderson, Farabow, Garrett & Dunner, LLP

(57) ABSTRACT

A sensor for sensing the integrity of a pressure relief device, along with associated systems and methods, are disclosed. The sensor may sense a designed area of weakness of a pressure relief device, such as an explosion vent or rupture disk. A monitor may monitor a signal from the sensor, which may be transmitted between the sensor and monitor by way of a sensor loop. In response to a change in the designed area of weakness, the signal from the sensor may be altered or interrupted, indicating that the designed area of weakness has changed. The signal from the sensor may be, for example, an electrical signal, optical signal, or an air flow in a pneumatic loop.

48 Claims, 12 Drawing Sheets

(58) Field of Classification Search
CPC ........ Y10T 137/8158; Y10T 137/0396; G01M 3/002; F28F 1/42; G01F 1/74; G01N 33/0075
USPC ....... 340/679, 633, 634, 539, 521, 601, 577, 340/693, 540, 568.1, 686.1, 649, 691; 73/23.2, 31.01, 23.42, 31.02; 137/551, 137/71, 552.7, 469, 554; 702/51, 54, 702/130, 50
See application file for complete search history.

(56) References Cited

U.S. PATENT DOCUMENTS

| | | | |
|---|---|---|---|
| 4,441,350 A | | 4/1984 | Short, III et al. |
| 4,464,936 A | | 8/1984 | McIntire et al. |
| 4,481,850 A | | 11/1984 | Allen |
| 4,579,001 A | | 4/1986 | Hosterman |
| 4,930,654 A | * | 6/1990 | Thibeault et al. ............ 220/253 |
| 4,978,947 A | | 12/1990 | Finnegan |
| 5,305,982 A | * | 4/1994 | Tamari ............................... 251/5 |
| 5,454,024 A | * | 9/1995 | Lebowitz ........................ 379/40 |
| 5,631,634 A | | 5/1997 | Strelow |
| 6,252,510 B1 | * | 6/2001 | Dungan ......................... 340/632 |
| 6,283,138 B1 | * | 9/2001 | Friend et al. ................... 137/14 |
| 6,310,550 B1 | * | 10/2001 | Wagener ..................... 340/568.1 |
| 6,598,454 B2 | | 7/2003 | Brazier et al. |
| 2002/0029808 A1 | * | 3/2002 | Friend et al. ................. 137/551 |
| 2005/0160786 A1 | | 7/2005 | Brazier et al. |
| 2006/0185899 A1 | * | 8/2006 | Alft et al. ........................ 175/24 |
| 2009/0124963 A1 | * | 5/2009 | Hogard et al. .................. 604/30 |
| 2010/0106434 A1 | * | 4/2010 | Killion et al. .................. 702/51 |
| 2010/0305883 A1 | * | 12/2010 | Danzy ............................. 702/50 |
| 2011/0301881 A1 | * | 12/2011 | Danzy ............................. 702/50 |

OTHER PUBLICATIONS

Extended European Search Report for European Application No. 14160468.6—174 (Aug. 29, 2014) (8 pages).

\* cited by examiner

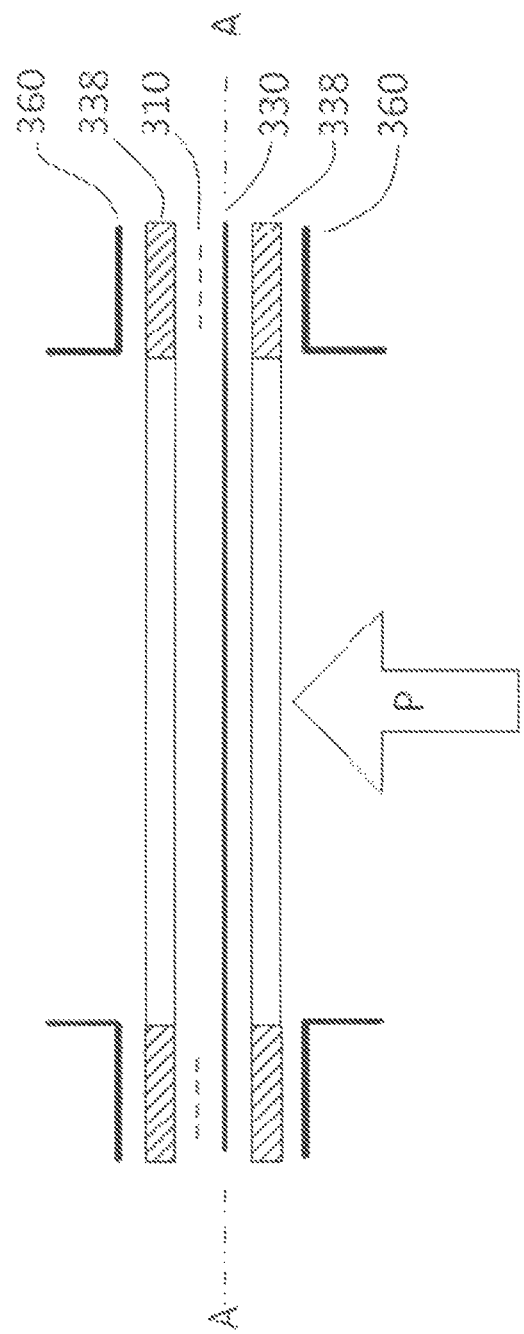

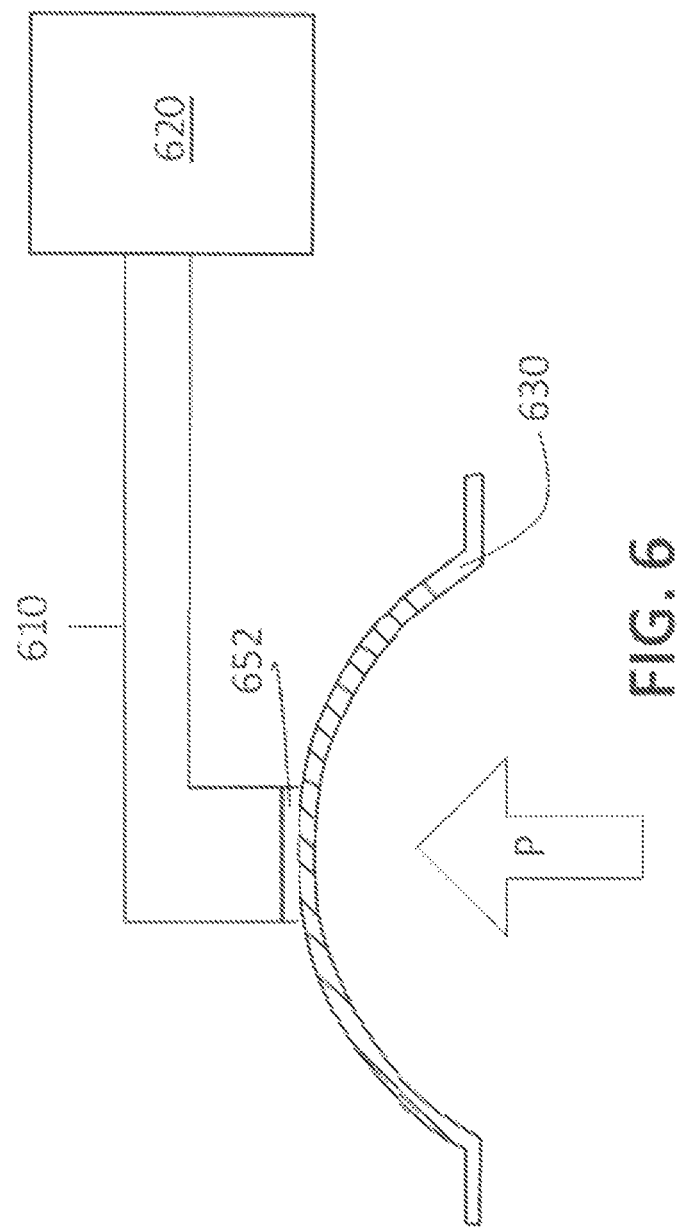

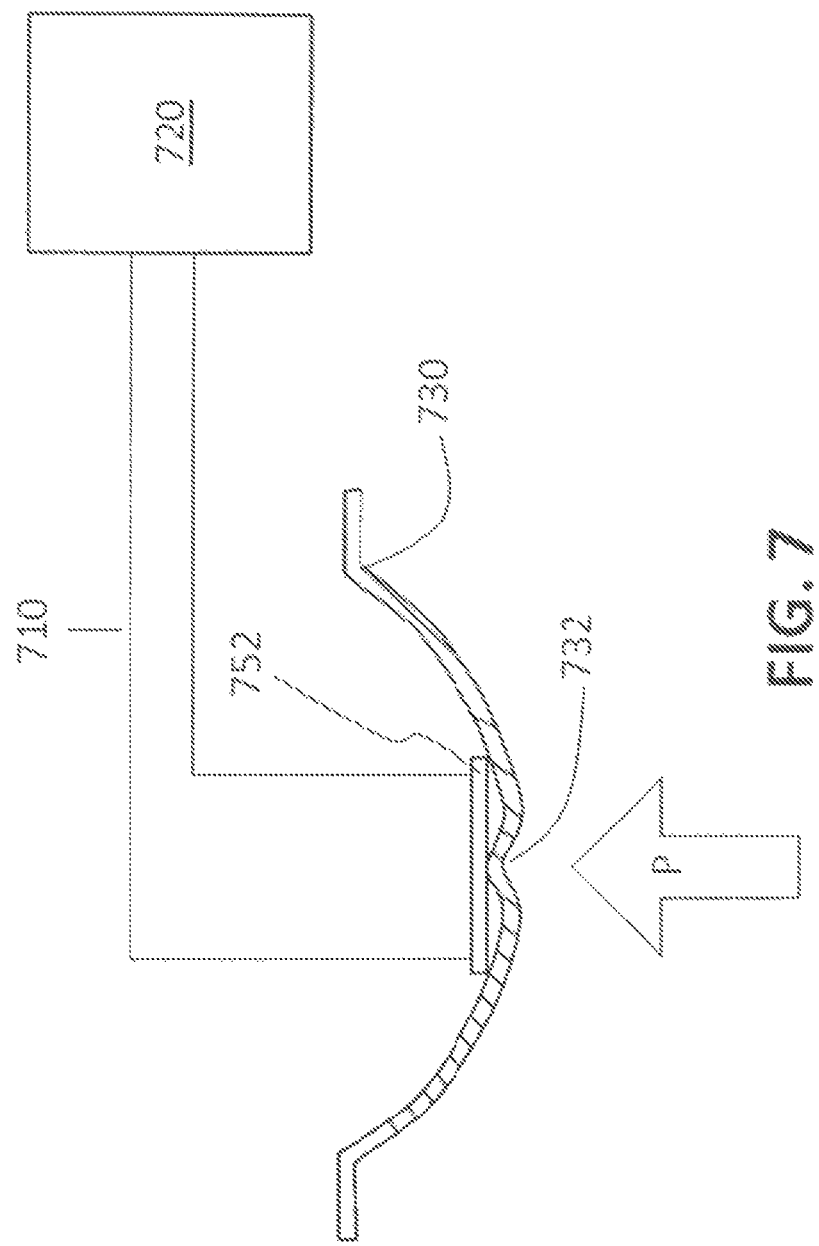

PRESSURE RELIEF DEVICE INTEGRITY SENSOR

CROSS-REFERENCE TO RELATED APPLICATIONS

This application claims the benefit of U.S. Provisional Application No. 61/213,937, filed Jul. 31, 2009, by Geof Brazier et al. and titled PRESSURE RELIEF DEVICE INTEGRITY SENSOR, the disclosure of which is expressly incorporated herein by reference.

FIELD OF THE DISCLOSURE

This disclosure generally relates to a sensor for sensing the integrity of a pressure relief device, along with associated systems and methods.

BACKGROUND

Pressure relief devices are commonly used as safety devices in systems containing pressurized fluids in gas or liquid form. A pressure relief device will vent fluid from a system when the pressure in the system reaches a predetermined level—usually before it reaches an unsafe level. Exemplary pressure relief devices include explosion vents and rupture disks. Examples of pressure relief devices include those illustrated in co-owned U.S. Pat. Nos. 4,441,350 and 4,481,850, the entire contents of which are hereby incorporated by reference.

Pressure relief devices may come in any number of materials and shapes. Pressure relief devices are commonly manufactured from metal; however, they may be made from polycarbonate sheeting, woven fabric, elastomers, or a combination of materials. A pressure relief device may be rectangular, round, trapezoidal, triangular, or any custom shape desired to fit a given application.

A pressure relief device may be provided with at least one designed area of weakness, which controls the set pressure and/or at least one location at which the device will vent fluid from the system. A designed area of weakness may be manufactured directly into the material of the pressure relief device. For example, a burst pattern or opening pattern may be cut by laser, mechanical cutting, water jet cutting, or any other suitable method for cutting the pressure relief device. When cut into a burst pattern or opening pattern, the pressure relief device may concentrate pressure on uncut areas between cuts. These areas may constitute the designed areas of weakness. In another example, a designed area of weakness may be formed by way of a score line, shear line, indentation, or any other suitable manufacturing process that weakens part of the pressure relief device.

A designed area of weakness also may comprise a secondary component added to the pressure relief device. For example, when a pressure relief device is cut into a desired opening pattern, it may be provided with at least one activation component affixed to the pressure relief device. The activation component may take the form of a tab or any other component suitable to control the pressure at which a pressure relief device opens. The activation component may be made from a number of suitable materials. For example, it may be desired to provide a light weight plastic, such as polycarbonate, pressure relief device with at least one metal activation component. Such a pressure relief device will vent fluid when the pressure on the device causes the metal activation component(s) to fail.

The designed areas of weakness may also be designed for the pressure relief device to burst or rupture in a particular pattern. A pressure relief device may be designed to burst or rupture peripherally, such that a single "petal" of the explosion vent opens to release fluid. For example, a rectangular pressure relief device may be cut or weakened on three sides, leaving the fourth side to act as a hinge to retain the device's petal when fluid is released. Alternatively, a pressure relief device may be designed to burst or rupture centrally. For example, a rectangular pressure relief device may be cut or weakened along a diagonal line and a circular pressure relief device may be cut or weakened along a radial line.

Pressure relief devices may be provided with activation sensors to detect when a pressure relief device is opened or activated, e.g., in response to an overpressure situation. Such activation sensors are disclosed in commonly owned U.S. Pat. Nos. 4,978,947 and 6,598,454, the entire contents of which are hereby incorporated by reference. An activation sensor may be a magnetically activated proximity switch. Alternatively, an activation sensor may be a loop of wire that breaks when the pressure relief device opens. Such activation sensors may be used to trigger an automated process shut down upon activation of the pressure relief device.

A pressure relief device may become strained or compromised without activation. Sources of strain on a pressure relief device may include damage due to external factors such as wind, lightning, or impact by a foreign object. Another source of strain on a pressure relief device may be pressure from the system. For example, a pressure relief device may experience subtle changes in its physical profile as the pressures applied to it—including forward and back pressures—change. A pressure relief device may have a particular region or feature that is particularly responsive to such changes prior to activation of the pressure relief device. That region may occur at or adjacent to a designed area of weakness. Alternatively, that region may occur at a point that is apart from the designed area of weakness but nonetheless experiences a relatively high level of pre-activation deformation in response to pressure changes. As one example, in a pressure relief device having a cross-shaped score line pattern that divides the pressure relief device into four "petals," a particularly responsive region may be located near the center of each petal. Whether located at a designed area of weakness or elsewhere, a particularly responsive region may be referred to as a pre-activation reactive region.

If a pressure relief device is strained or compromised without activating, the compromised condition may go undetected by an activation sensor. In addition, a strained or compromised pressure relief device may not be detected by visual inspection. Many pressure relief devices are used in remote, concealed, or elevated areas that make visual inspection difficult. Additionally, many pressure relief devices are used in negative pressure systems that would prevent gases or liquids from visibly leaking out of a damaged pressure relief device. Such systems may make the telltale signs of process leakage unavailable or unreliable as a means of identifying the compromised condition of the pressure relief device.

An undetected leak can be dangerous or otherwise undesirable, because it may vent gas or liquid from the system into the environment. Additionally, an undetected leak may expose the system to undesirable elements from the environment, such as moisture, gas, or dust ingress from the surrounding environment. An undetected strain on the pressure relief device may adversely affect the performance of the pressure relief device, including its longevity or the pressure at which it will activate.

In light of the foregoing, there is a need for a pressure relief device integrity sensor that can detect an abnormal mode of a pressure relief device—i.e., when a pressure relief device has become compromised or strained without activating, or when activation of a pressure relief device is imminent but has not yet occurred. Thereby, an operator may know to replace a compromised or strained pressure relief device before secondary complications or dangers occur. The integrity sensor—and associated systems and methods—of the present disclosure achieves these, or other, advantages.

SUMMARY

To attain one or more of the above or other advantages, as embodied and broadly described herein, the disclosure is directed to a pressure relief device integrity sensor comprising a sensor element configured to sense a condition of a pre-activation reactive region of a pressure relief device, with the sensor element configured to transmit a signal indicative of a normal condition. A change in or interruption of the signal indicates a change in the pre-activation reactive region.

The disclosure is further directed to a pressure relief device integrity sensor comprising a normally closed circuit, wherein the normally closed circuit is configured to deform in response to a non-activating change in at least one pre-activation reactive region of a pressure relief device.

The disclosure is still further directed to a system for sensing the integrity of a pressure relief device, comprising a pressure relief device having one or more pre-activation reactive regions, and at least one sensor element configured to transmit a signal indicating a condition of at least one of the one or more pre-activation reactive regions before the pressure relief device activates.

The disclosure is directed to a method of monitoring a pressure relief device, comprising sensing a condition of a pre-activation reactive region of the pressure relief device and transmitting a signal indicative of a condition of the pressure relief device.

The disclosure is also directed to a pressure relief apparatus for a pressurized system, comprising a pressure relief device comprising an activating portion configured to relieve pressure when pressure in the pressurized system exceeds a threshold, wherein the activating portion comprises a designed area of weakness and a pre-activation reactive region, and an integrity sensor configured to sense the integrity of the pressure relief device before activation.

The disclosure is yet further directed to a method of monitoring the integrity of a pressure relief device having a pre-activation reactive region, wherein the pressure relief device is installed with a pressurized system. The method comprises sensing a strain at the pre-activation reactive region, and generating a signal when the strain indicates that the pressure relief device has been deformed without activating.

The disclosure is still further directed to a method of monitoring the integrity of a pressure relief device, comprising applying a pressure to the pressure relief device, measuring a strain of at least one region of the pressure relief device, identifying a pre-activation reactive region based on the strain measured at the at least one region of the pressure relief device, and monitoring a deformation of the pre-activation reactive region.

BRIEF DESCRIPTION OF THE DRAWINGS

The accompanying drawings, which are incorporated in and constitute a part of this specification, illustrate several embodiments and together with the description, serve to explain principles of the disclosure.

FIG. 3B is an exploded cross-sectional illustration of the integrity sensor of FIG. 3A along line A-A;

FIG. 6 is a cross-sectional illustration of an integrity sensor installed with a forward-acting rupture disk;

FIG. 7 is a cross-sectional illustration of an integrity sensor installed with a reverse-acting rupture disk;

DESCRIPTION OF THE EMBODIMENTS

Reference will now be made in detail to the present exemplary embodiments, examples of which are illustrated in the accompanying drawings.

Figure 1:
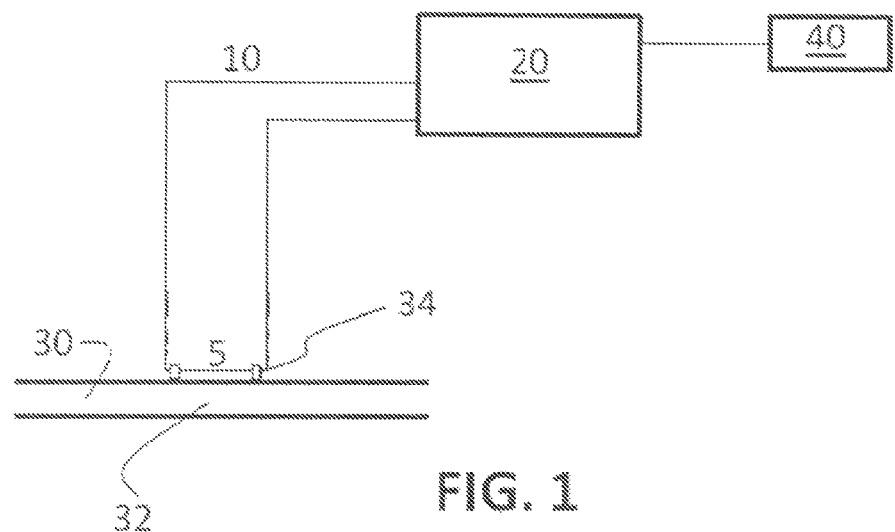
FIG. 1 is a diagrammatic illustration of an integrity sensor installed with a pressure relief device according to one aspect of the disclosure.

An exemplary embodiment of an integrity sensor of the present disclosure is shown in FIG. 1. In accordance with the disclosure, there is provided a sensor element 5 that connects via a pathway—sensor loop 10—to a monitor 20 that monitors a signal of the sensor element 5. Sensor element 5 may be a segment of sensor loop 10 configured to transmit a signal, or sensor element 5 may be a separate component from sensor loop 10 configured to transmit a signal. By "transmitting" the signal, the sensor element 5 may, for example, originate or generate a signal, pass a signal originated or generated elsewhere within a sensor loop 10, or modify a signal originated or generated elsewhere within a sensor loop 10.

As shown in FIG. 1, the pathway in the form of sensor loop 10 is physically connected to the monitor 20; however, one of skill in the art would understand that all or part of the pathway forming sensor loop 10 may be wireless. Thus the monitor 20 may wirelessly monitor the sensor element 5.

Sensor element 5 is positioned along a pressure relief device 30 containing a pre-activation reactive region 32.

Pressure relief device 30 may be, for example, an explosion vent or rupture disk. Pressure relief device 30 may be installed with a pressurized system and may be designed to activate—e.g., open, burst, or rupture—in response to a predetermined pressure within the pressurized system. By activating, the pressure relief device 30 allows pressure to escape from the pressurized system. In one embodiment, the pressure relief device 30 may activate or initiate activation at the pre-activation reactive region 32.

In some instances, the pre-activation reactive region 32 may become strained or compromised without activating. In those instances, the pre-activation reactive region 32 may undergo a physical change or deformation, such as, for example, stretching or compression. This physical change may be different from the change normally experienced by a pre-activation reactive region 32 during activation, and may indicate that the pressure relief device 30 and/or pre-activation reactive region 32 is abnormal or damaged. Alternatively, this physical change may be similar to the change undergone by a pre-activation reactive region 32 during the activation process, except the activation—e.g., opening, bursting, or rupturing—has not been completed. Physical changes or deformations that do not immediately result in complete activation may be referred to generally as "non-activating" changes Similarly, the physical condition of a pressure relief device that has not completely activated may be referred to generally as a "pre-activation" condition. Monitoring such non-activating changes and/or pre-activation conditions allows monitoring the integrity of a pressure relief device. A pressure relief device 30 with a deformed pre-activation reactive region 32 may have lost integrity, may operate abnormally or unpredictably, and may require replacement. Additionally, a deformed pre-activation reactive region 32 may indicate that activation of the pressure relief device is imminent. Thus by monitoring non-activating changes and/or pre-activation conditions, an operator may replace the pressure relief device 30 before full activation occurs.

To determine whether a non-activating change evidences damage to a pressure relief device, one may first determine the expected strain or deformation at the pressure relief device's maximum allowable working pressure (or at a pressure slightly above that maximum level). In an operational pressure relief device, if the magnitude of strain or deformation exceeds that expected level, then the pressure relief device may have been (or is being) compromised.

In addition to magnitude of strain or deformation, other measures may indicate that a pressure relief device has suffered (or is suffering) an integrity-compromising non-activating change. For example, the rate of strain on a pressure relief device may be used. In one embodiment, the rate of strain may be calculated as strain per unit of pressure. In another embodiment, the rate of strain may be calculated as strain per unit of time. In either embodiment, if the rate of strain exceeds maximum allowable levels, then the pressure relief device may have undergone (or be undergoing) an integrity-compromising deformation. In addition or alternatively, the strain rate may be compared to the magnitude of pressure acting on the device. In that case, if the strain rate exceeds a maximum allowable rate at a given pressure, the pressure relief device may have undergone (or is undergoing) an integrity-compromising deformation. In one example, if strain continues to increase when pressure is held constant, then the pressure relief device may be compromised. To prevent false alarms, a rate-of-strain value may be compared to the magnitude of strain. In this manner, a relatively high rate-of-strain value may be disregarded when the actual strain value is within safe levels.

Returning to FIG. 1, at least a portion of the sensor element 5 and/or sensor loop 10 is attached to or made integral with the pressure relief device 30 by way of an attachment 34 such as an adhesive, rivet, spot weld, or any other suitable means of attachment. The sensor element 5 and sensor loop 10 may be designed to minimize or eliminate their effect on the strength of the pressure relief device 30. However, alternatively, the sensor element 5 and/or sensor loop 10 may be designed to impart additional strength to the pressure relief device 30, such that it will withstand a higher level of pressure.

In one embodiment, the sensor element 5 and sensor loop 10 may be made of a suitable conductive material capable of carrying or transmitting an energy signal. In addition, the sensor element 5 and sensor loop 10 may be made of a plurality of conductive materials, each of which being capable of carrying or transmitting an electric signal. Thus, expensive materials, such as tantalum or silver, may be used sparingly within the sensor 5 and sensor loop 10, if at all. In one embodiment, an expensive material, such as tantalum or silver, may be used to form the sensor element 5 while a less expensive material, such as insulated copper wire, may be used to form the sensor loop 10. Thus tantalum or silver, which may be desirable for their corrosion resistance, tensile strength, and other physical properties, may be used only where such materials can be of most use—e.g., adjacent a predetermined area of weakness, or where exposed to corrosive environments. Insulated copper wire or other less expensive materials can be used where the particular properties of tantalum or silver, e.g., are not required.

Figure 4A:
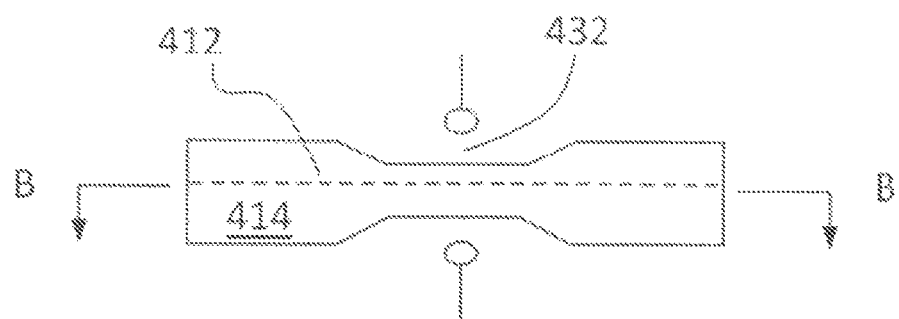
FIG. 4A is a diagrammatic illustration of a fracture member with a conductive path positioned across a designed area of weakness.
Figure 4B:
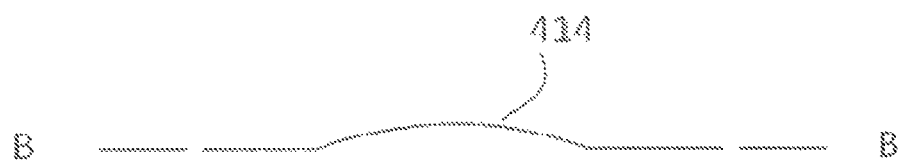
FIG. 4B is a cross-sectional illustration of the fracture member of FIG. 4A along line B-B.

In one embodiment the sensor element 5 may comprise a conductive wire 412 attached to a frangible fracture member 414 as best shown in FIGS. 4A and 4B, with the fracture member 414 being placed adjacent to a designed area of weakness 432, which may also be a pre-activation reactive region. The fracture member 414 may be made of plastic—such as a thin plastic foil, skin, or sheet—and include a conductive track such as a printed circuit or a layer of wire or flattened wire. As shown in FIG. 4B, the fracture member 414 may be arched to provide a degree of freedom of movement for a pressure relief device. The fracture member 414 may be designed to fracture when the designed area of weakness 432 is deformed or compromised before activation of the pressure relief device.

When attached or integral to the pressure relief device 30, the sensor 5 and sensor loop 10 may be electrically isolated from the material of pressure relief device 30 in order to prevent contamination or dissipation of a sensor signal running through the sensor 5 and sensor loop 10. In addition, the sensor 5 and sensor loop 10 may be electrically isolated from the pressure relief device 30 to prevent the ignition of dust or gas in or around the pressure relief device 30. The sensor 5 and sensor loop 10 may be electrically isolated by, for example, insulating tape (such as DuPont™ Kapton® polyimide tape) or by use of an insulated wire for at least part of the sensor 5 and/or sensor loop 10.

Additionally or alternatively, isolation may not be necessary where electrical current is not present or is "safe." For example, the sensor loop 10 and sensor element 5 may comprise a fiber optic monitoring circuit in which no electrical current is present, or the sensor loop 10 and sensor element 5 may comprise an intrinsically safe electrical circuit (such as a zener circuit). Such a circuit would allow operation in hazardous environments, such as National Electrical Code (NEC) Class 1 Divisions 1 or 2 and Class 2

Divisions 1 or 2 environments and European ATEX Zone 0 or lower and Zone 20 or lower locations. For added safety, the sensor loop 10 and/or sensor element 5 may be electrically grounded.

In another embodiment, the sensor loop 10 may be a pneumatic loop, which does not necessarily use an electrical signal. In this embodiment, the sensor loop 10 may comprise, for example, a small diameter hollow tube, and the sensor element 5 may comprise a segment of the small diameter hollow tube. The sensor loop 10 is a closed loop and air flow through the tube constitutes a normal condition of the closed circuit. A monitoring device may monitor the air flow with, for example, a spinning wheel or other device for detecting air flow. When sensor loop 10 in the form of a tube is cut or broken at sensor element 5 in response to a change in the pressure relief device 30, the circuit is broken and air flow through the pneumatic loop will cease. Cessation of air flow may signal to the monitor 20 that the pressure relief device 30 has been compromised without activating or is about to activate.

In yet another embodiment, the sensor loop 10 may be a pressurized pneumatic loop whose pressure is monitored by a monitor 20. The sensor element 5 may comprise part of the pressurized pneumatic loop. If the pneumatic loop is broken at sensor element 5, the pressure will drop. Alternatively, a change in shape of the tube at sensor element 5 may cause a change in pressure. For example, if the tube is crimped at sensor element 5, pressure may increase. A change in pressure of the sensor loop 10 in the form of a pneumatic loop may signal to the monitor 20 that the pressure relief device 30 has been compromised without activating or that activation is imminent. Thus, an operator may know to replace the pressure relief device 30 before activation or before secondary complications from a compromised pressure relief device occur.

Returning to FIG. 1, the sensor loop 10 may physically connect to a monitor 20, which may transmit and/or receive signals through the sensor loop 10. Because the integrity sensor of the present disclosure may be used in hazardous operating environments, the sensor loop 10 may connect to the monitor 20 through a durable and weather resistant connector. Appropriate monitors may include those sold by BS&B Safety Systems under the names Burst Disk Monitor (BDM), SmartDisk® wireless monitoring system, and Rupture Disk Manager. Additionally, any monitor that may monitor, transmit, and/or receive signals transferred through the sensor loop 10 may be used. If a wireless monitor is used, it may monitor a signal transferred through the sensor loop 10 without requiring a physical connection to the sensor loop 10.

In operation, a pressure relief device 30 is installed in a first, uncompromised state. A sensor element 5 and/or sensor loop 10 may be attached across or attached directly to a pre-activation reactive region 32 of the pressure relief device 30. With the pressure relief device 30 in its uncompromised state, the sensor loop 10 forms a circuit with sensor element 5, allowing the monitor 20 to continuously monitor a signal—such as a trickle current—in the sensor loop 10. When the pressure relief device 30 is compromised or strained without activating, such as, for example, by deformation in a pre-activation reactive region 32, it may undergo a physical change that can be registered by the sensor 5. Sensor 5 may transmit a signal to or through sensor loop 10.

In one embodiment, the sensor loop 10 initially forms a normally closed circuit. This circuit may be, for example, an electrical circuit, optical circuit, or pneumatic circuit. When the pressure relief device 30 is compromised or strained without activating, the sensor loop 10 may be broken at sensor element 5, creating an open circuit. The monitor 20 may interpret the opening of the circuit to mean that the pressure relief device 30 has been compromised or that activation is imminent.

In another embodiment, the sensor loop 10 initially forms a closed electrical circuit with sensor 5, the closed circuit having a first resistance. When the pressure relief device 30 is compromised or strained near pre-activation reactive region 32, the sensor element 5 may be stretched or deformed, thereby altering its resistance and the resistance of the electrical circuit. For example, if sensor element 5 is stretched, its diameter may decrease, which increases its resistance. The monitor 20 may interpret a change in the electrical circuit's resistance to mean that the pressure relief device 30 has been compromised without activating or that activation is imminent. In a related embodiment, if the pressure relief device 30 subsequently is further compromised or activates, the sensor element 5 may break completely and open the initially closed electrical circuit. The monitor 20 may interpret the circuit's opening to mean that the pressure relief device 30 has been further compromised or has activated. Thus, the sensor loop 10 and sensor 5 may be able to detect both that the pressure relief device 30 has been compromised without activating and that the pressure relief device 30 has been activated.

As shown in FIG. 1, the monitor 20 may be connected to an alarm 40 or any other indicator that can notify an operator that the pressure relief device 30 has been compromised without activating or that activation is imminent. The alarm 40 may provide notification in the form of a light or sound. Additionally, the monitor 20 may be operatively connected to a computer that may register signals generated by the monitor 20. The computer may, in turn, have a graphical user interface or other display that can notify an operator if the pressure relief device 30 has been compromised without activating or that activation is imminent. The alarm 40 and/or monitor 20 may be configured to notify an operator of a compromised pressure relief device based, for example, on magnitude of strain or deformation, rate of strain, magnitude of pressure, or a combination of such factors as discussed above.

Figure 2:
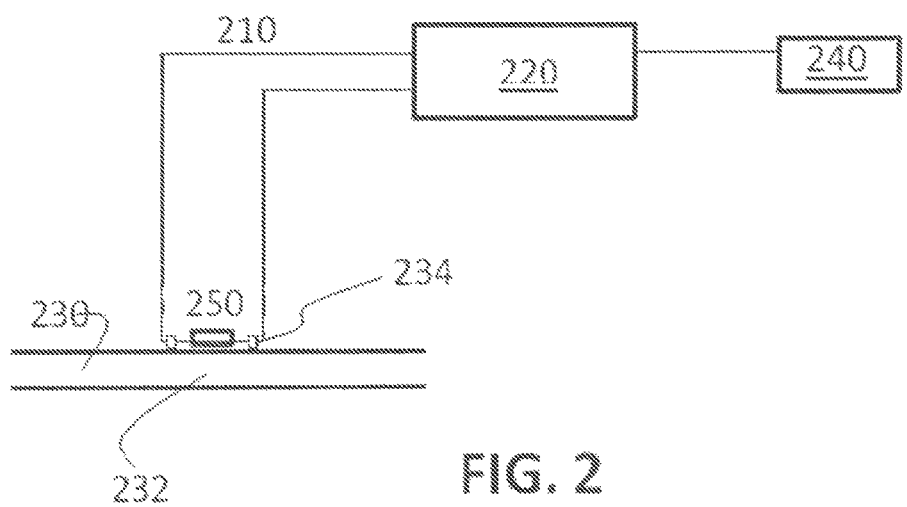
FIG. 2 is a diagrammatic illustration of an integrity sensor including a sensing device installed with a pressure relief device according to one aspect of the disclosure.

In another embodiment, shown in FIG. 2, a sensing device 250 may be placed adjacent to a pre-activation reactive region 232 of a pressure relief device 230. The sensing device 250 may be attached to pressure relief device 230 and/or the pre-activation reactive region 232 by an attachment mechanism 234. As illustrated in FIG. 2, the sensing device 250 physically connects to a sensor loop 210, which physically connects to a monitor 220. It is comprehended, however, that the sensing device 250 may be wirelessly monitored by the monitor 220. In a wireless embodiment, the sensor loop 210 is understood to be a non-physical loop by which the monitor 220 monitors a signal from the sensing device 250.

Figure 5A:
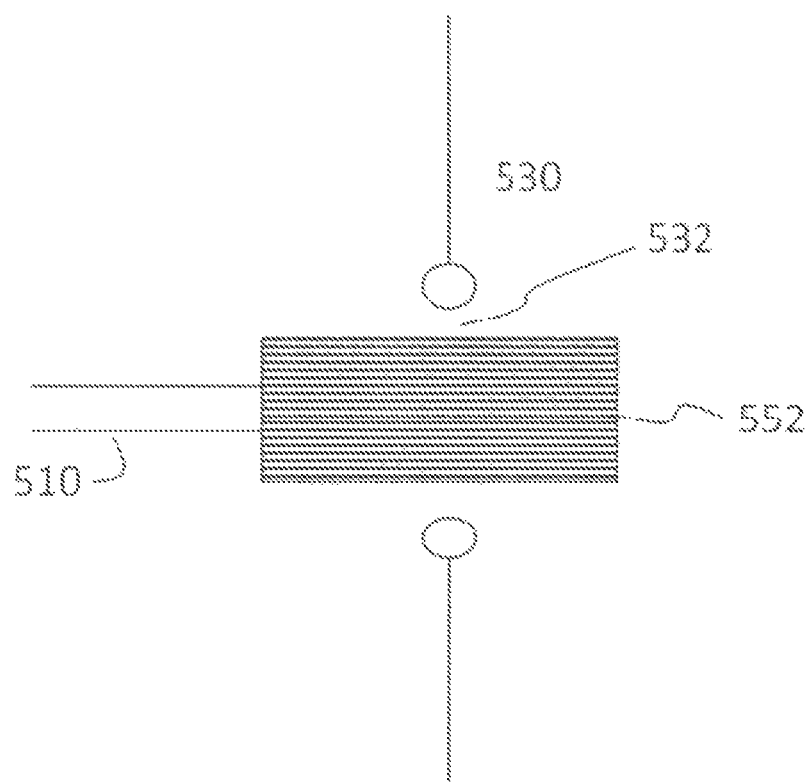
FIG. 5A is a diagrammatic illustration of a strain gage for use in an integrity sensor.
Figure 5B:
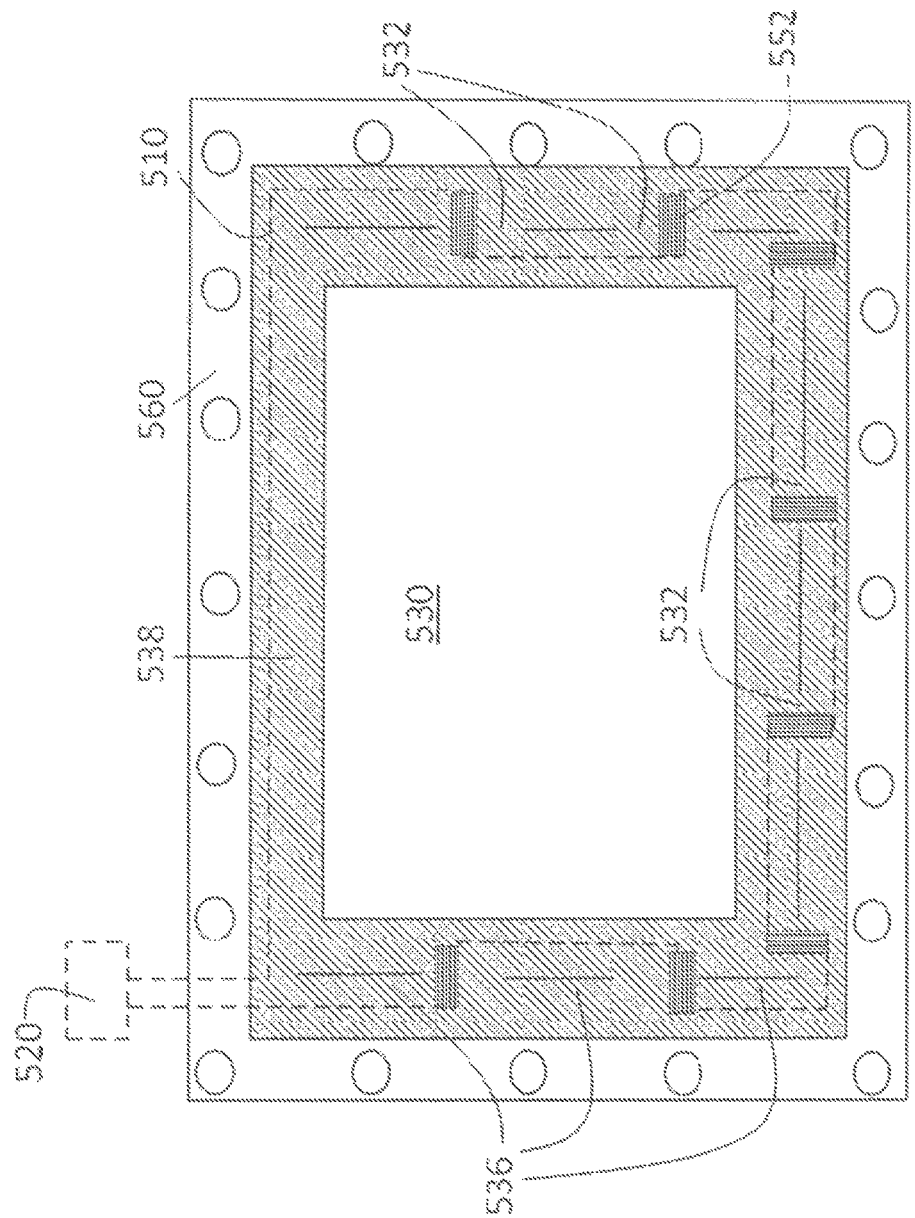
FIG. 5B is a diagrammatic illustration of an integrity sensor comprising a plurality of strain gages.

When the pressure relief device 230 is in a first, uncompromised state, the sensing device 250 may transmit a first signal to a monitor 220. When the pressure relief device 230 deforms at the pre-activation reactive region 232, the sensing device 250 may transmit a second signal, different from the first signal, to the monitor 220, thereby signaling that the pressure relief device 230 has been compromised without activating or is about to activate. An appropriate sensing device 250 may include, for example, one or more strain gages (as illustrated in FIGS. 5A and 5B).

Figure 3A:
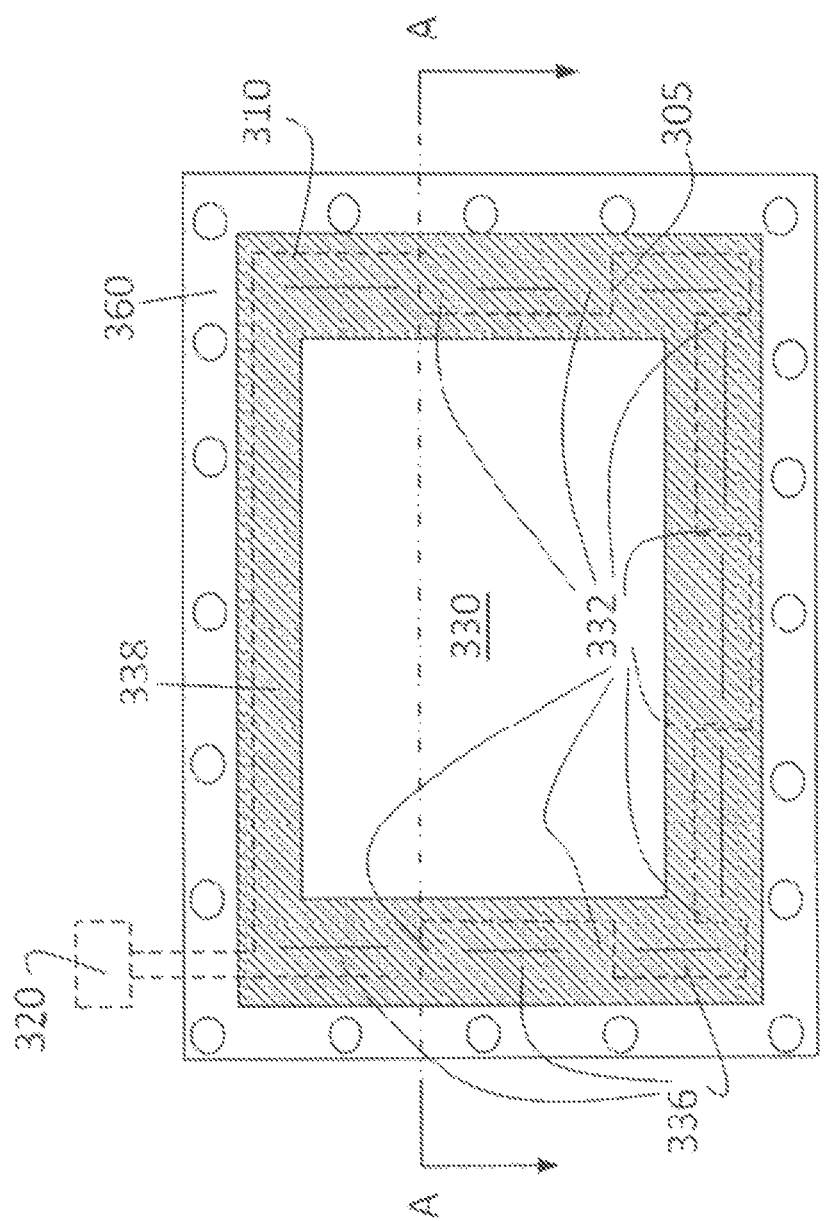
FIG. 3A is a diagrammatic illustration of an integrity sensor installed with an explosion vent.

Although the integrity sensor has been described as monitoring the integrity of a single pre-activation reactive region, the present disclosure also comprehends an integrity sensor that monitors a plurality of pre-activation reactive regions. In the embodiment illustrated in FIGS. 3A-3B, for example, an integrity sensor is installed with an explosion vent 330 having a plurality of pre-activation reactive regions in the form of designed areas of weakness 332, which are provided between a series of cuts 336 in a pattern. Pressure on the explosion vent will be concentrated in the areas between each cut 336, thus creating the areas of weakness 332. The cuts 336 may be created by the use of laser cut stitches or any other suitable methods. As shown in FIG. 3A, a sensor loop 310 is attached to the vent 330. A sensor element 305 extends across each of the designed areas of weakness 332, and one or more sensor elements 305 may be attached to one or more of the areas of weakness 332. Although FIG. 3A depicts an explosion vent 330, the disclosure may be used with any suitable pressure relief device. By way of non-limiting example, the disclosure may be used with a rupture disk. As another non-limiting example, the disclosure may be used with a composite rupture disk, which may include a plurality of precut designed areas of weakness.

As best illustrated in FIG. 3B, the sensor loop 310 may be held next to the explosion vent 330 by or under a gasket 338. Also as shown in FIG. 3B, the sensor loop 310 may be sufficiently durable to allow it to be clamped between a frame 360. The frame 360 may be, for example, a set of pipe flanges or part of an opening of a pressurized system. If the sensor loop 310 is clamped between frame 360 or otherwise installed into a system, its initial properties may change. For example, if the sensor loop 310 comprises an electrical circuit, the initial resistance of the circuit may be affected when the sensor loop 310 is clamped between the frame 360. In another example, if the sensor loop 310 comprises a pneumatic circuit, the air flow or pressure of the circuit may be affected when the sensor loop 310 is clamped between the frame 360. In either case, it may be desirable to recalibrate a monitor 320 after the sensor loop 310 is installed to accurately recognize when the pressure relief device 330 is compromised without activating or that activation is imminent.

As shown in FIG. 3B, the sensor loop 310 is installed external to the pressurized system (designated as "P"). The present disclosure comprehends, however, that one or more components of the sensor loop 310 or sensor element 305 may be installed internal to the pressurized system P.

When one or more of the designed areas of weakness 332 of vent 330 deforms without activation, sensor element 305 may be broken (opening a normally closed circuit) or stretched (increasing the resistance in the circuit), thereby signaling that the explosion vent 330 has been compromised. To facilitate breaking the sensor element 305 upon deformation of a designed area of weakness, the sensor element(s) 305 may include one or more frangible fracture members 414 placed adjacent to a designed area of weakness 332. As previously described and illustrated at FIGS. 4A and 4B, a fracture member 414 may be made of plastic—such as a thin plastic foil, skin, or sheet—and include a conductive track such as a printed circuit or a layer of wire or flattened wire. As shown in FIG. 4B, the fracture member 414 may be arched to provide a degree of freedom of movement for vent 330.

An integrity sensor may be designed to stretch in response to strain on the pressure relief device. In such a design, the integrity sensor may be provided with one or more sensing devices in the form of a strain gage 552. These strain gages 552 may be positioned across a pre-activation region in the form of a designed area of weakness 532 as illustrated in FIGS. 5A and 5B, and may be attached to the designed area of weakness. When a pressure relief device 530 is in a first, uncompromised configuration, the strain gage 552 exhibits a first resistance. Accordingly, a signal passing through the sensor loop 510 and strain gage 552 will have a first current as monitored by a monitor 520. When the pressure relief device 530 is compromised or about to activate, the strain gage 552 will be strained and exhibit a second resistance different from the first resistance. Thus, the signal passing through the sensor loop 510 will change. For example, the signal may change from a first current to a second current different from the first. Alternatively, the signal may change from a first voltage to a second voltage different from the first. The signal may be monitored by a monitor 520 (as shown in FIG. 5B). If the second current or voltage exceeds or drops below a threshold value, the monitor 520 may interpret the change as a signal that the pressure relief device 530 has been compromised without activating or is about to activate. Where a strain gage 552 comprises part of the sensor loop 510, the sensor loop 510 may comprise, for example, a 4~20 mA, 0-5 VDC, or 0-10 VDC circuit, or any other suitable monitoring circuit.

When a strain gage 552 is used with the present disclosure, it may be placed into a "bridge circuit" (not shown), such that when the strain gage 552 stretches or compresses (in unison with the surface of the pressure relief device), the voltage across the bridge circuit changes. The voltage change across the bridge circuit may be slight; therefore, an amplifier (not shown) may be placed in the circuit to boost the signal to more measurable levels. In one embodiment, the signal may be monitored or tracked, for example, by software or an oscilloscope. The bridge circuit may be mounted in an electrical enclosure external to the pressure relief device, with only the strain gage 552 being exposed to the pressure relief device.

In one embodiment, the strain gage 552 may be selected for its compatibility with the material of the pressure relief device to which it is attached. Temperature may affect the behavior and/or shape of both the strain gage and the pressure relief device. Accordingly, in one embodiment, the material of a strain gage may be selected to match the material of the pressure relief device.

In another embodiment, the strain gage 552 may be mounted in an electrically insulating material (not shown). A pressure relief device may be electrically conductive. For this reason, mounting the strain gage 552 in electrically insulating material, or otherwise electrically isolating the material from the pressure relief device, may prevent the signal through the strain gage from running to ground or dissipating through the pressure relief device.

In yet another embodiment, the strain gage 552 may be rigidly bonded to the pressure relief device. By rigidly bonding to the pressure relief device, the strain gage 552 may move in unison with the pressure relief device.

The strain gage 552 of the present disclosure may be applied to the outlet side of the pressure relief device. The outlet side of a pressure relief device may be more benign than the inlet side. For example, the inlet side of a pressure relief device may be subject to corrosive or abrasive conditions. Therefore, placing the strain gage 552 on the outlet side of the pressure relief device may isolate it from such conditions. It is contemplated, however, that the strain gage 552 may be positioned on the inlet side of a pressure relief device. In such an application, the strain gage 552 may be protected from adverse conditions. For example, the strain gage 552 may be protected by way of a protective barrier against harmful electrical, mechanical, or chemical elements. Moreover, it is contemplated that two strain gages 552 may be used—one each on opposing inlet and outlet sides of a pressure relief device. In such an arrangement, both strain gages 552 may be placed into a bridge circuit (with one being inverted). By this arrangement, the signal generated at a given pressure could be maximized.

In yet another embodiment, the strain gage 552 may utilize a low voltage and/or low current. Such a low voltage or low current may be capable of operating at intrinsically safe power levels, enabling the strain gage to be applied in a hazardous combustible gas or vapor or dust environment. For example, such a strain gage 552 may be placed safely into a combustible gas or vapor media piping system.

While an individual strain gage is illustrated in FIG. 5A, a plurality of strain gages 552 may be provided in series, in a "daisy chain" configuration (or any other suitable configuration) within the sensor loop 510 as illustrated in FIG. 5B. The sensor loop 510 may be installed with an explosion vent 530, for example, in association with a gasket 538. The explosion vent may have a series of cuts 536, which create pre-activation reactive regions in the form of designed areas of weakness 532. Each strain gage 552 may be attached to a designed area of weakness 532. Based on the initial resistance of each strain gage, the "daisy chain" sensor loop 510 will have an initial resistance value. When one or more designed areas of weakness 532 is strained, the resistance of its associated strain gage 552 will change. Likewise the resistance in the sensor loop 510 will change in a manner that may indicate the integrity of the pressure relief device 530 has been compromised without activating or that activation is imminent.

An integrity sensor including a strain gage 552, as illustrated in FIGS. 5A and 5B, may also be useful for a pressure relief device in the form of a rupture disk 630 or 730 (illustrated in FIGS. 6 and 7). For example, in a forward acting rupture disk 630 (wherein a concave side of the disk faces the pressurized system P), a pre-activation reactive region may be created, for example, by the apex 632 of the disk 630 as illustrated in FIG. 6. Additionally, pre-activation reactive region may be provided using a designed area of weakness at any other suitable part of the disk at which rupture should be initiated by using a feature such as one or more score lines or indentations in the rupture disk 630 (not shown). This type of feature may be used to provide a pre-activation reactive region either at the feature (e.g., at the score line or indentation) or in an area between or otherwise defined by one or more features (e.g., between two score lines or indentations, or in an area encircled at least in part by one or more score lines). An integrity sensor, including a sensor loop 610 and a strain gage 652 (or any other suitable sensor element or sensing device), may be used to determine whether strain at the apex 632 indicates that the rupture disk 630 has been compromised without rupturing or that rupture is imminent. As shown, the strain gage 652 may be attached at the disk's apex 632.

Similarly, in a reverse acting rupture disk 730 (wherein a convex side of the disk faces the pressurized system P), as illustrated in FIG. 7, a pre-activation reactive region may be created by a designed area of weakness at the point at which reversal is to be initiated. The illustrated disk 730 is designed to initiate reversal at its apex. Thus the disk 730 is provided with a designed area of weakness 732 in the form of an indentation at its apex. Indentations such as indentation 732 may be provided for one or more of several uses, including, for example: to establish the point at which the disk will initiate reversal; to enhance the accuracy of burst pressure within a batch of rupture disks; and/or to lower the burst pressure for a given thickness of domed structure, which enables increased material thickness to be used for low burst pressure ratings. While the indentation in FIG. 7 is visible, it is contemplated that the principles of this disclosure may be used with an indentation that is not (or does not remain) visible. For example, the indentation may be subject to pressure reforming or smoothing to make it less visible. Although an indentation 732 is illustrated, any other suitable designed area of weakness can be used, such as a score line. An integrity sensor, including a sensor loop 710 and a strain gage 752 (or any other suitable sensor element or sensing device), may be used to determine whether deformation of the rupture disk 730 at its designed area of weakness 732 indicates that the rupture disk 730 has been compromised or that rupture is imminent. Additionally, it is comprehended that a reverse acting rupture disk 730 may be designed to initiate reversal without the use of features such as an indentation or score line. Thus, a strain gage 752 may be positioned at any pre-activation reactive region or wherever reversal will initiate.

Figure 8:
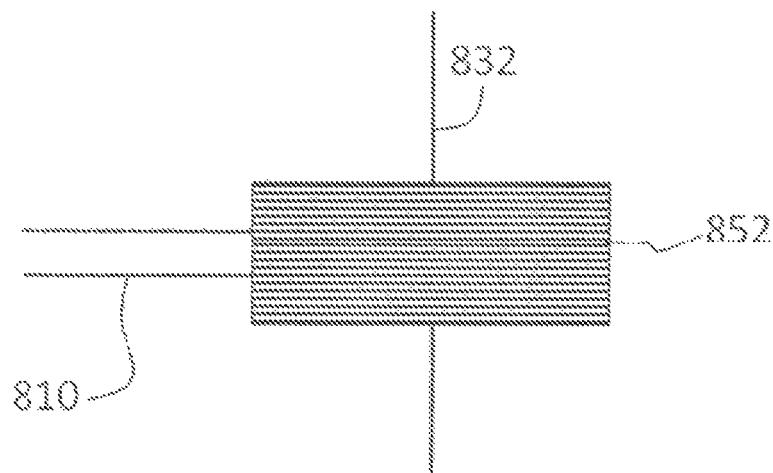
FIG. 8 is a diagrammatic illustration of a strain gage for use in an integrity sensor, installed across a score line.

A more detailed view of a strain gage placed across a score line is illustrated in FIG. 8. A strain gage 852 connected to a sensor loop 810 is placed across score line 832. The strain gage 852 may be attached to score line 832. Strain across the score line 832 is registered by strain gage 852. Although the strain gage 852 is illustrated spanning score line 832, in an alternative embodiment, pre-activation reactive region may be defined between one or more features such as a score line. In such an embodiment, a strain gage may be positioned on that pre-activation reactive region between the one or more features.

Figure 9:
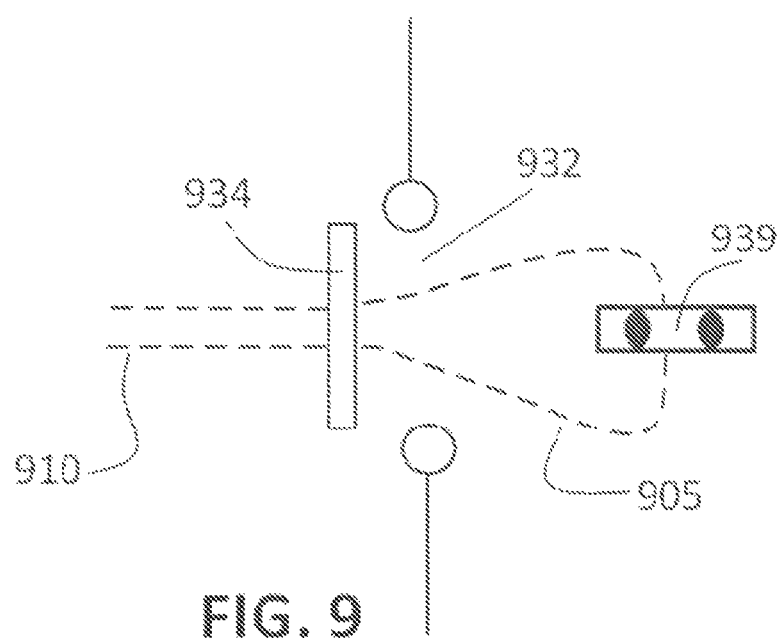
FIG. 9 is a diagrammatic illustration of an integrity sensor installed with a cutting tab.

In another embodiment of an integrity sensor according to the present disclosure, a sensor loop 910 may connect to a sensor element 905. The sensor element 905 may extend across and/or attach to a designed area of weakness 932 and be constrained by an element having a sharp edge, such as, for example, sharp tab 939 as shown in FIG. 9. The sharp tab 939 may have an integral sharp edge or be provided with a separate cutting element. The sensor element 905 may be secured against the pressure relief device 930 with a limited freedom of movement relative to the device 930. While the sensor element 905 is intact, the sensor loop 910 is in a normally closed configuration that transmits a signal to a monitor (not shown) as previously described. If the pressure relief device 930 is compromised without activating in a manner deforming the designed area of weakness 932, the sensor element 905 may impinge on the sharp edges of the tab 939 and be crimped or severed such that it can no longer pass a signal. Thus the normally closed sensor loop 910 is opened, interrupting the sensor signal to the monitor 920.

Figure 10:
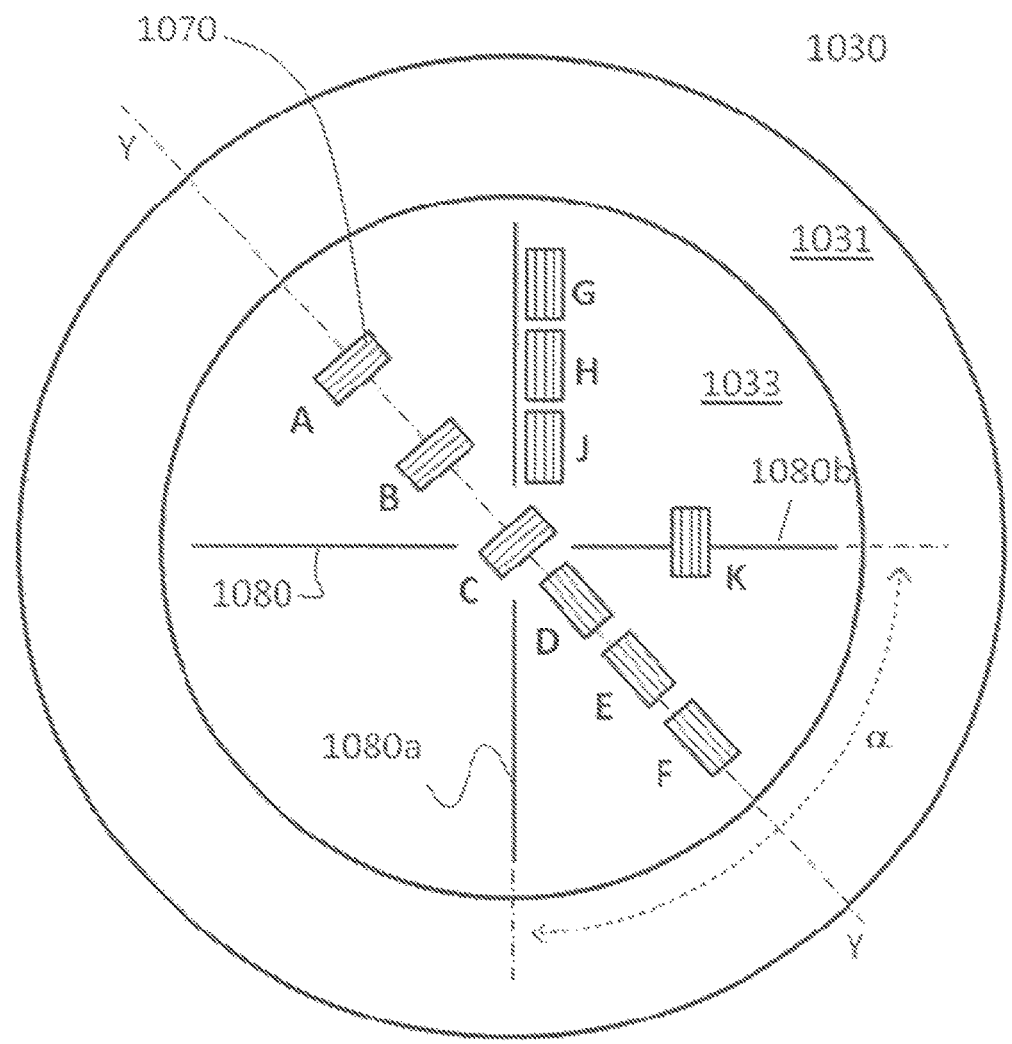
FIG. 10 is a diagrammatic illustration of integrity sensors installed on a rupture disk.

An integrity sensor according to the present disclosure may be placed at any desired pre-activation reactive region. FIG. 10 illustrates the placement of integrity sensors 1070 on a rupture disk 1030. As illustrated, the rupture disk 1030 has a flange portion 1031 and a rupturable portion 1033. The rupturable portion 1033 may be provided with one or more features 1080, which may be used to define a pre-activation reactive region. A sensor 1070 may be placed adjacent to the pre-activation reactive region. As shown in FIG. 10, the pre-activation reactive region may be created—and the accompanying sensor 1070 correspondingly may be placed—at any of a number of positions (e.g., A, B, C, D, E, F, G, H, J, K, or another position) on the rupture disk 1030. For example, a pre-activation reactive region may be defined at position K—or another position where the pre-activation reactive region overlaps with a defined area of weakness (e.g., score line 1080*b*). As another example, a pre-activation reactive region may be defined at a position such as G, H, or J—where the pre-activation reactive regions is defined adjacent to the defined area of weakness (e.g., one or more score lines 1080). As yet further examples, a pre-activation reactive region may be defined at position such as A, B, C, D, E, or F—where the pre-activation reactive region is defined apart from the defined areas of weakness (e.g., score lines 1080). Wherever the pre-activation reactive region is created, a sensor 1070 may be placed at that location.

In one embodiment, a rupture disk 1030 may be provided with four surface features 1080 in the form of score lines. In this embodiment, the rupture disk 1030 is designed to burst along the pattern formed by the score lines 1080, such that the rupture disk 1030 creates four "petals" upon rupture. The score lines 1080 may be designed such that at lower pressures, the score lines 1080 actually act as a support for the rupturable portion 1033. In such an embodiment, as pressure on the rupturable portion 1033 increases, the rupturable portion 1033 may experience greater deformation at the center of each "petal" (e.g., at position E) than at each score line 1080. Only after the pressure on the rupturable portion 1033 increases beyond a threshold level does the rupture disk deform sufficiently at the score lines 1080 so as to cause a rupture. In such an embodiment, it has been shown to be particularly effective for sensing the integrity of a rupture disk 1030 when a sensor 1070 is positioned at the center of one or more "petals" of the rupturable portion 1033. Thus, in one embodiment, an angle α is defined by score lines 1080*a* and 1080*b*. A line Y-Y bisects the angle α. A sensor may, for example, be positioned along line Y-Y, such as illustrated by sensors D, E, and F in FIG. 10.

The above embodiment is exemplary only, and it is contemplated that a rupture disk may be designed so that the pre-activation reactive region is created in a position other than the center of a "petal" formed by score lines, and a sensor may be placed at that alternative pre-activation reactive region. In addition, although the rupture disk of FIG. 10 is illustrated as having a circular contour, it is contemplated that rupture disks or pressure relief devices of varying shapes and dimensions may be used with the present disclosure. No matter the shape of pressure relief device or the pre-activation reactive region, a sensor may be positioned at or adjacent to the pre-activation reactive region to sense the integrity of the rupture disk.

Figure 11A:
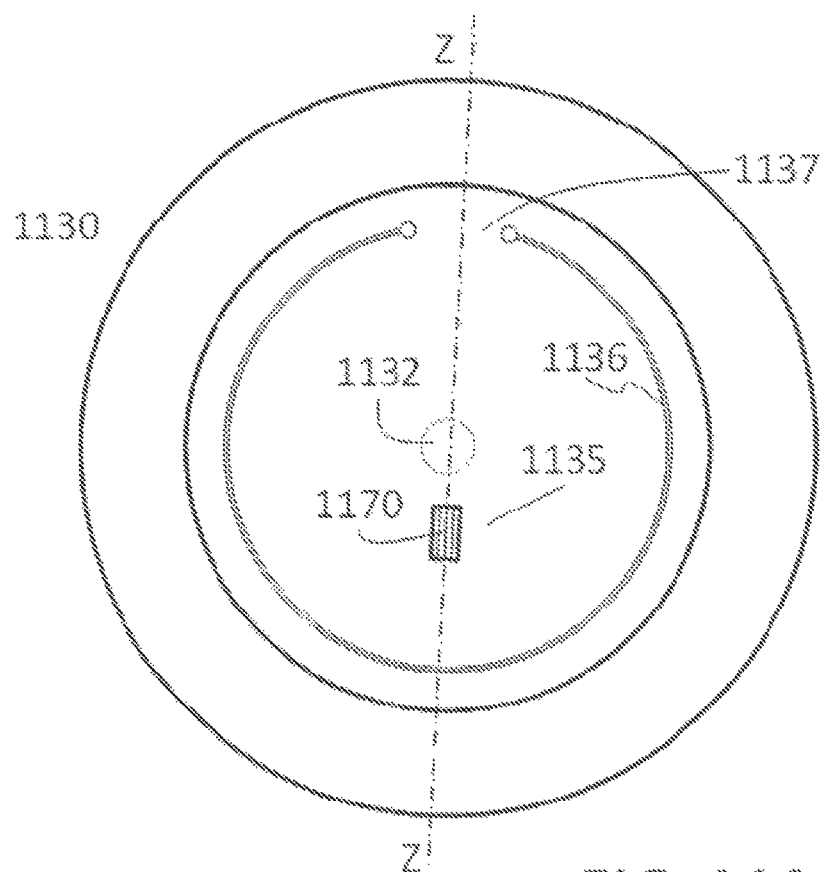
FIG. 11A is a diagrammatic illustration of a rupture disk with an indentation and a score line coupled with an integrity sensor.
Figure 11B:
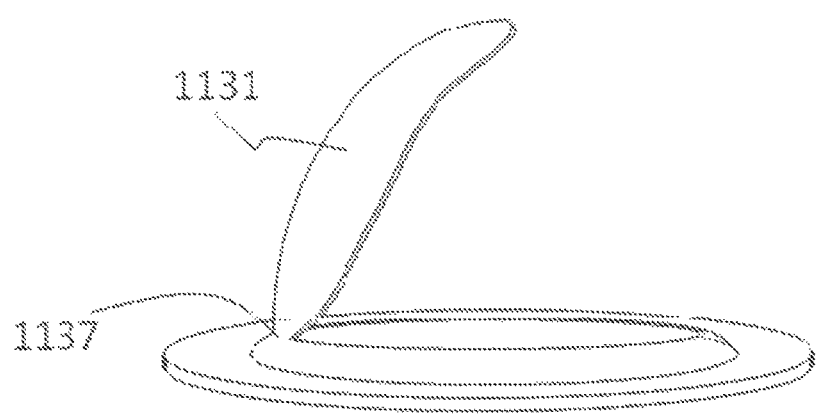
FIG. 11B is a perspective view of the rupture disk of FIG. 11A after activation.

In an embodiment illustrated in FIG. 11A, a rupture disk 1130 includes an indentation 1132 at its apex and a score line 1136 in the form of an arc having a first end and a second end. The arc may surround at least a portion of the activating portion of the rupture disk 1130. In such an embodiment, the score line 1136 creates a burst pattern for the rupture disk's activation. The rupture disk may burst along the score line 1136, leaving a petal 1131 retained by the hinge portion 1137 (between the ends of arctuate score line 1136) as illustrated in FIG. 11B. In this embodiment, a pre-activation reactive region 1135 may be created apart from the apex of the rupture disk 1130. For example, where the apex and hinge portion 1137 define a line Z-Z, a pre-activation reactive region 1135 may be created along line Z-Z, on a side of the rupture disk generally opposite of the hinge portion 1137. Thus, to monitor the integrity of the rupture disk 1130, a sensor 1170 may be placed at the pre-activation reactive region 1135. In an alternative embodiment, the pre-activation region may be created elsewhere on the rupture disk 1130. The sensor 1170 may be placed wherever is appropriate to monitor a pre-activation reactive region. Although the embodiment illustrated in FIGS. 11A and 11B is circular, it is contemplated that other geometries may be used with the disclosure. Additionally, although FIG. 11A depicts a score line, it is contemplated that any suitable designed area of weakness—including any suitable line of weakness—may be used.

Figure 12A:
FIGS. 12A-12C illustrate various sensors.
Figure 12B:
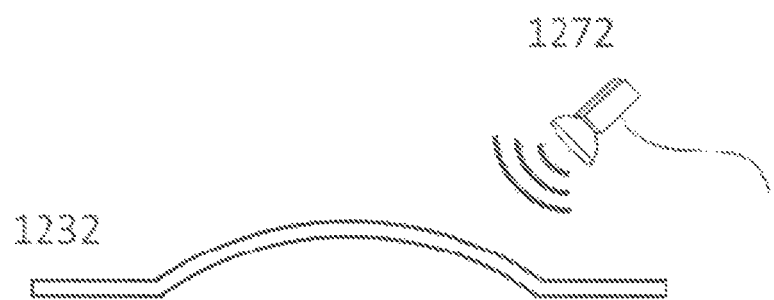
Figure 12C:

While sensors have been described as being attached to or adjacent to a pre-activation reactive region of a pressure relief device, it is also contemplated that other types of sensors may be used with the present disclosure. For example, an optical measuring device 1271 may be used, as illustrated in FIG. 12A. The optical measuring device 1271 may, for example, use a laser beam reflected off the surface of a pressure relief device's 1231 pre-activation reactive region to measure changes in the pre-activation reactive region. Alternatively, as illustrated in FIG. 12B, a radio wave device 1272 may be used as a sensor. Using a radio wave device 1272, the sensor may measure changes in the pre-activation reactive region of a pressure relief device 1232. In yet another alternative embodiment, as illustrated in FIG. 12C, the sensor may be a vibration detector 1273. The vibration detector 1273 detects vibration frequencies of the pressure relief device 1233. The vibration frequency of a pressure relief device 1233 may change, for example, according to the pressure, force, load, temperature, or other conditions applied to it. Thus, a change in vibration frequency may indicate a change in the shape or condition of the pressure relief device 1233.

Before an integrity sensor can be placed at a pre-activation reactive region, the pre-activation reactive region must be identified. Accordingly, the disclosure contemplates a method by which the pre-activation region may be identified and an integrity sensor applied. According to that method, a strain gage (such as strain gage 552 illustrated in FIG. 5A) may be placed on one or more areas of a pressure relief device, and the strain gage's response may be measured when pressures are applied to the pressure relief device. By using a strain gage at multiple areas of the pressure relief device, the area or areas with the highest pre-activation reaction can be identified. Based on that information, a sensor can be installed at or near the pre-activation reactive region so that the pressure relief device's integrity may be monitored. Alternatively, the pre-activation reactive region may be sensed by a sensor located apart from the pre-activation reactive region. In an embodiment wherein the pressure relief device is provided with a designed area of weakness, the pre-activation reactive region may or may not overlap with the designed area of weakness.

While the above described embodiments of a pressure relief device integrity sensor have been depicted as utilizing an explosion panel or rupture disk, the disclosure is not intended to be limited to this particular structure. Therefore, alternative pressure relief devices are intended to be within the scope of this disclosure, including all equivalent structures for sealing engagement between two sections of different pressures. Also, although the above described embodiments have been depicted as monitoring the integrity of a pressure relief device before activation, this disclosure is not intended to be limited to that function alone. Therefore, embodiments of the described integrity sensor may also monitor additional parameters of a pressure relief device. Additionally, it is contemplated that individual features of one embodiment may be added to, or substituted for, individual features of another embodiment. Accordingly, it is within the scope of this disclosure to cover embodiments resulting from substitution and replacement of different features between different embodiments.

The above described embodiments and arrangements are intended only to be exemplary of contemplated mechanisms and methods. Other embodiments will be apparent to those skilled in the art from consideration of the specification and practice of the disclosure herein.

What is claimed is:

1. A pressure relief device integrity sensor, comprising:
   a sensor element configured to sense a condition of a pre-activation reactive region of a rupturable pressure relief device configured to activate by rupturing in response to a predetermined pressure, the sensor element configured to transmit a signal indicative of a normal condition;
   wherein the sensor element comprises a conductive element exhibiting a first resistance;
   wherein the conductive element is configured to deform in response to a compromise in the integrity of the pre-activation reactive region, and wherein the deformation of the conductive element causes the conductive element to exhibit a second resistance; and
   wherein a change in or interruption of the signal indicates a compromise in the integrity of the pre-activation reactive region before activation of the pressure relief device.

2. The pressure relief device integrity sensor of claim 1, wherein the sensor element is configured to attach to the pre-activation reactive region of the explosion panel.

3. The pressure relief device integrity sensor of claim 1, further comprising:
   a monitor; and
   a sensor loop transmitting the signal between the sensor element and the monitor.

4. The pressure relief device integrity sensor of claim 3, wherein the sensor loop and sensor element comprise a normally closed circuit, and wherein the normally closed circuit is configured to open in response to the compromise in the integrity of the pre-activation reactive region.

5. The pressure relief device integrity sensor of claim 1, wherein the deformable conductive element is a strain gage.

6. The pressure relief device integrity sensor of claim 1, wherein the sensor element comprises at least one frangible fracture member.

7. The pressure relief device integrity sensor of claim 1, wherein the sensor element comprises a wire.

8. A pressure relief device integrity sensor, comprising:
   a normally closed circuit configured to transmit a signal;
   wherein the normally closed circuit comprises a conductive element having a first resistance, wherein the conductive element is configured to deform in response to a non-activating change in at least one pre-activation reactive region of an explodable pressure relief device, and wherein the deformation of the conductive element causes the conductive element to exhibit a second resistance; and
   wherein a change in or interruption of the signal indicates that the pre-activation reactive region has been compromised.

9. The pressure relief device integrity sensor of claim 8, wherein the normally closed circuit is configured to attach across the at least one pre-activation reactive region.

10. The pressure relief device integrity sensor of claim 9, wherein the conductive element is configured to break in response to the non-activating change in the at least one pre-activation reactive region.

11. The pressure relief device integrity sensor of claim 10, wherein the conductive element comprises a frangible fracture member.

12. The pressure relief device integrity sensor of claim 10, wherein the conductive element comprises a wire.

13. The pressure relief device integrity sensor of claim 10, further comprising a tab, wherein the conductive element is configured to impinge on the tab in response to the non-activating change in the at least one pre-activation reactive region.

14. A system for sensing the integrity of a pressure relief device, comprising:
   a non-reversible pressure relief device having one or more pre-activation reactive regions; and
   at least one sensor element configured to transmit a signal indicating a condition of at least one of the one or more pre-activation reactive regions before the pressure relief device activates, wherein the sensor element comprises a conductive element exhibiting a first resistance;
   wherein the conductive element is configured to deform when the integrity of the pre-activation reactive region is compromised before activation of the pressure relief device, wherein the deformation of the conductive element causes the conductive element to exhibit a second resistance.

15. The system of claim 14, further comprising:
   a monitor configured to monitor the signal from the sensor element; and
   a sensor loop configured to transmit the signal between the sensor element and the monitor.

16. The system of claim 15, wherein the sensor loop comprises a normally closed circuit.

17. The system of claim 16, wherein the normally closed circuit is configured to open when the integrity of the pre-activation reactive region is compromised prior to activation of the pressure relief device.

18. The system of claim 17, wherein the normally closed circuit comprises an electrical circuit.

19. The system of claim 18, wherein the sensor element comprises a frangible member.

20. The system of claim 17, wherein the normally closed circuit comprises an optical circuit.

21. A method of monitoring a non-reclosable pressure relief device, comprising:
   sensing a condition of a pre-activation reactive region of the pressure relief device;
   transmitting a signal indicative of a condition of the pressure relief device, wherein the signal comprises an electrical signal having a voltage and a current; and
   changing or interrupting at least one of the voltage and current of the electrical signal to indicate a non-activating deformation of the pre-activation reactive region.

22. The method of claim 21, further comprising:
   triggering an alarm when the signal indicates the non-activating deformation of the pre-activation reactive region of the pressure relief device.

23. A pressure relief apparatus for a pressurized system comprising:
   a pressure relief device comprising an activating portion configured to relieve pressure by bursting or rupturing when pressure in the pressurized system exceeds a threshold, wherein the activating portion comprises a designed area of weakness and a pre-activation reactive region; and an integrity sensor configured to sense that the pressure relief device has weakened before activation, the sensor comprising a conductive element exhibiting a first resistance, wherein the conductive element is configured to deform and exhibit a second resistance when the pressure relief device has weakened before activation.

24. The apparatus of claim 23, wherein the designed area of weakness comprises a score line.

25. The apparatus of claim 23 wherein the designed area of weakness comprises a first score line and a second score line, wherein:
the first score line and second score line define an angle between them; and
the pre-activation reactive region is defined within the angle between the first and second score lines.

26. The apparatus of claim 25, wherein the integrity sensor is attached to the activating portion at the pre-activation reactive region.

27. The apparatus of claim 26, wherein the pre-activation region is defined on a line bisecting the angle between the first and second score lines.

28. The apparatus of claim 23, wherein the pre-activation reactive region overlaps with the defined area of weakness.

29. The apparatus of claim 23, wherein the pre-activation reactive region is defined adjacent to the defined area of weakness.

30. The pressure relief apparatus of claim 24, wherein the score line defines an arctuate shape surrounding at least a portion of the activating portion.

31. The pressure relief apparatus of claim 30, wherein activating portion further comprises an indentation.

32. The pressure relief apparatus of claim 31, wherein the arctuate shape comprises a first end and a second end, wherein:
the pressure relief device further comprises a hinge area between the first end and second end of the arctuate shape;
the hinge area and the indentation define a line; and
the pre-activation reactive region is defined on the line on the opposite side of the indentation from the hinge area.

33. The pressure relief apparatus of claim 32, wherein the integrity sensor is positioned adjacent to the pre-activation region.

34. A method of monitoring the integrity of a non-reclosing pressure relief device having a pre-activation reactive region, wherein the pressure relief device is installed with a pressurized system, comprising:
sensing a strain at the pre-activation reactive region, wherein sensing a strain comprises deforming a conductive element to change the resistance of the conductive element; and
generating a signal when the strain indicates that the pressure relief device has been deformed without activating.

35. The method of claim 34, further comprising:
sensing a pressure of the pressurized system;
wherein strain is sensed as a magnitude of strain; and
wherein generating a signal further comprises generating a signal when the level of strain exceeds an allowable threshold level of strain at the sensed pressure.

36. The method of claim 34, further comprising:
sensing the pressure of the pressurized system;
calculating a rate of change of strain per unit of pressure; and
wherein generating a signal further comprises generating a signal when the rate of change of strain per unit of pressure exceeds an allowable threshold.

37. The method of claim 34, further comprising:
calculating a rate of change of strain per unit of time; and
wherein generating a signal further comprises generating a signal when the rate of change of strain per unit of time exceeds an allowable threshold level at a magnitude of strain.

38. A method of monitoring the integrity of a rupturable pressure relief device configured to activate by rupturing in response to an overpressure, comprising:
applying a pressure to the rupturable pressure relief device;
measuring a strain of at least one region of the rupturable pressure relief device;
identifying a pre-activation reactive region based on the strain measured at the at least one region of the rupturable pressure relief device; and
monitoring a deformation of the pre-activation reactive region before activation of the pressure relief device;
wherein monitoring a deformation of the pre-activation reactive region before activation of the pressure relief device comprises deforming a conductive element in response to the deformation, wherein deforming the conductive element causes a change in the resistance of the conductive element.

39. The method of claim 38, further comprising:
identifying at least one magnitude of strain that indicates the rupturable pressure relief device has been compromised without activating.

40. The method of claim 39, wherein identifying at least one magnitude of strain comprises identifying a maximum safe allowable magnitude of strain.

41. The method of claim 38, wherein applying a pressure to the rupturable pressure relief device further comprises applying a plurality of pressures to the rupturable pressure relief device, and wherein measuring the strain of the at least one region of the pressure relief device further comprises measuring the strain at each of the plurality of pressures, the method further comprising:
identifying at least one rate of strain per unit of time that indicates the pressure relief device has been compromised.

42. The method of claim 41, wherein identifying at least one rate of strain per unit of time comprises identifying a maximum safe allowable rate of strain per unit of time.

43. The method of claim 42, wherein identifying a maximum safe allowable rate of strain further comprises identifying a maximum safe allowable rate of strain per unit of time at a given magnitude of strain.

44. The method of claim 38, wherein applying a pressure to the rupturable pressure relief device further comprises applying a plurality of pressures to the rupturable pressure relief device, and wherein measuring the strain of the at least one region of the rupturable pressure relief device further comprises measuring the strain at each of the plurality of pressures, the method further comprising:
identifying at least one strain at a threshold level of pressure that indicates the rupturable pressure relief device has been compromised.

45. The method of claim 44, wherein identifying at least one strain at a threshold level of pressure comprises identifying a maximum safe allowable strain at a threshold level of pressure.

46. The method of claim 38, further comprising:
applying a sensor to the pre-activation reactive region.

47. The method of claim 38, wherein the rupturable pressure relief device is a first pressure relief device, the method further comprising:
   identifying a pre-activation region of a second pressure relief device corresponding to the pre-activation region of the pressure relief device; and
   monitoring a deformation of the pre-activation region of the second pressure relief device.

48. The method of claim 47, further comprising:
   applying a sensor to the pre-activation reactive region of the second pressure relief device.

\* \* \* \* \*